United States Patent

Bennett et al.

(10) Patent No.: US 6,826,865 B2
(45) Date of Patent: Dec. 7, 2004

(54) GUN CHAMBERING DEVICE

(75) Inventors: Ronald B. Bennett, Bloomfield Hill, MI (US); Donald L. Barrett, Jr., Grand Blanc, MI (US)

(73) Assignee: Clymer Manufacturing Co., Rochester Hills, MI (US)

( * ) Notice: Subject to any disclaimer, the term of this patent is extended or adjusted under 35 U.S.C. 154(b) by 0 days.

(21) Appl. No.: 10/361,457

(22) Filed: Feb. 10, 2003

(65) Prior Publication Data

US 2004/0154210 A1 Aug. 12, 2004

(51) Int. Cl.⁷ ............................................... B23P 6/02
(52) U.S. Cl. ........................ 42/90; 42/76.01; 29/527.6
(58) Field of Search ......................... 42/90, 95, 76.01; 15/104.13; 29/527.6

(56) References Cited

U.S. PATENT DOCUMENTS

| | | | |
|---|---|---|---|
| 684,981 A | * 10/1901 | Drummond et al. ..... 15/104.19 |
| 1,535,007 A | * 4/1925 | Wood ..................... 89/14.7 |
| 1,665,915 A | 4/1928 | Ekman | |
| 1,786,520 A | * 12/1930 | Darling ................. 15/104.19 |
| 2,019,795 A | 11/1935 | Peterson | |
| 2,299,747 A | 10/1942 | Harter | |
| 2,332,704 A | 10/1943 | Enes et al. | |
| 2,718,708 A | 9/1955 | Kalberer | |
| 2,864,268 A | 12/1958 | Anderson | |
| 2,917,809 A | * 12/1959 | Braatz .......................... 42/78 |
| 3,543,429 A | 12/1970 | Bendele et al. | |
| 3,602,935 A | 9/1971 | McDonnell et al. | |
| 3,648,501 A | * 3/1972 | Kralowetz ................. 72/76 |
| 3,685,475 A | 8/1972 | Banks, Jr. | |
| 3,705,515 A | 12/1972 | Lee | |
| 3,736,835 A | 6/1973 | Hanson | |
| 3,815,397 A | 6/1974 | Hollencamp | |
| 3,818,563 A | 6/1974 | Beaulieu | |
| 3,890,682 A | 6/1975 | Eckstein | |
| 3,979,995 A | 9/1976 | Phillips | |
| 4,020,736 A | 5/1977 | Petersen | |
| 4,133,248 A | 1/1979 | Phillips | |
| 4,133,249 A | 1/1979 | Bachhuber et al. | |
| 4,321,737 A | 3/1982 | McIntyre | |
| 4,325,282 A | 4/1982 | Schaenzer | |
| 4,389,790 A | 6/1983 | Dunlap | |
| 4,455,777 A | 6/1984 | Callies | |
| 4,461,603 A | 7/1984 | Klee et al. | |
| 4,486,938 A | * 12/1984 | Hext ....................... 29/402.06 |
| 4,521,140 A | 6/1985 | Doescher et al. | |
| 4,593,598 A | 6/1986 | Gunder | |
| 4,723,472 A | 2/1988 | Lee | |
| 4,871,285 A | 10/1989 | Moore | |
| 4,930,240 A | * 6/1990 | Bice .............................. 42/95 |
| RE34,612 E | 5/1994 | Bender et al. | |
| 5,322,398 A | * 6/1994 | Schmidt et al. ............. 408/145 |
| 5,515,766 A | 5/1996 | Fleury | |
| 5,635,661 A | 6/1997 | Tuftee | |
| 5,649,465 A | 7/1997 | Beebe | |
| 5,727,295 A | 3/1998 | Gracey | |
| 5,733,077 A | 3/1998 | MacIntosh, Jr. | |
| 5,755,815 A | 5/1998 | Kochanek | |
| 5,836,099 A | * 11/1998 | Pace et al. ..................... 42/95 |
| 5,885,298 A | 3/1999 | Herrington et al. | |
| 6,010,440 A | 1/2000 | Miyano | |
| 6,101,915 A | 8/2000 | Sinclair | |
| 6,192,561 B1 | 2/2001 | Bennett | |
| 6,233,799 B1 | 5/2001 | Bennett | |

FOREIGN PATENT DOCUMENTS

| | | |
|---|---|---|
| JP | 405161932 | 6/1993 |
| RU | 143682 | 4/1961 |

* cited by examiner

Primary Examiner—Stephen M. Johnson
(74) Attorney, Agent, or Firm—Bliss McGlynn, P.C.

(57) ABSTRACT

A chambering device for a gun includes a shank having a plurality of cutting flutes, a projection extending from one end of the shank, at least one spacer disposed about the projection, and a shaft extending from the shank opposite the projection and adapted to rotate the shank along an interior of the barrel of the gun for enlarging the interior and providing a desired head spacing.

20 Claims, 3 Drawing Sheets

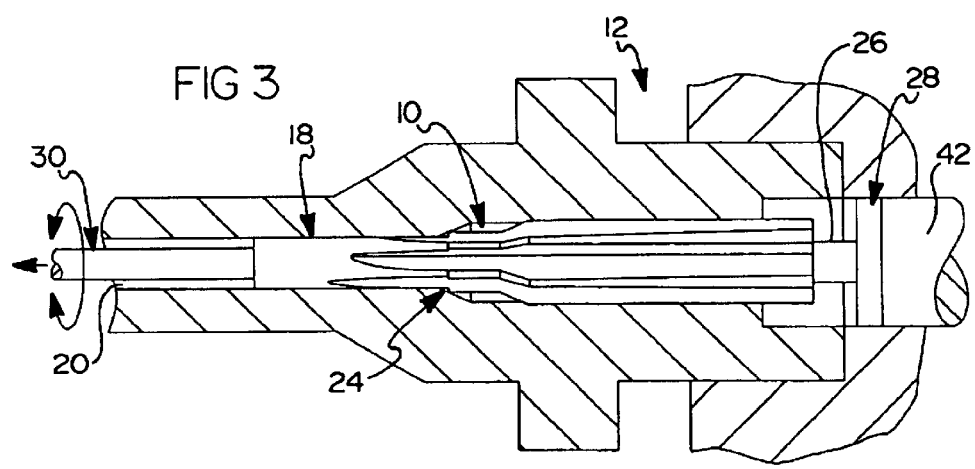
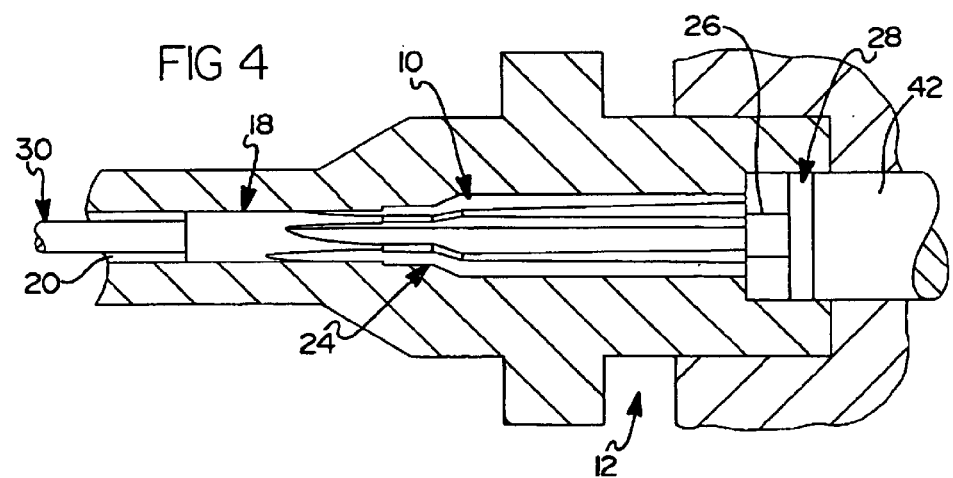
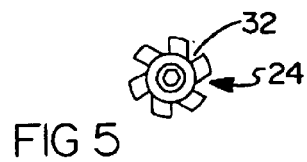

GUN CHAMBERING DEVICE

BACKGROUND OF THE INVENTION

1. Field of the Invention

The present invention relates generally to guns and, more particularly, to a chambering device for a gun.

2. Description of the Related Art

Chambering devices such as reamers or drills are used for machining or enlarging an interior or a chamber of a barrel of guns, such as automatic and semi-automatic pistols and rifles. These chambering devices generally extend longitudinally and have a relatively long tool shaft or shank extending therefrom. The shank includes a forward cutting end, which is rotated and pulled along the interior of the barrel of the gun during a cutting or chambering operation.

Commonly, in the manufacture of a gun, the interior of the barrel of the gun is only partially chambered. More specifically, the interior, except for head spacing for a head of a cartridge, is chambered, for example, in the case of a .223, a 5.56, an AR-15, a Ruger mini-14, and an Old Grande.

By way of background, a .223 semi-automatic rifle uses a Remington cartridge and is only a civilian weapon. A 5.56 is a military version of an old Colt design. An M-16 is a military version of a 5.56 and can be a full automatic or semi-automatic rifle. With an M-16, shells are run-in so fast that sloppiness in head spacing is needed. A .223 and a 5.56 use very similar cartridges and, thus, head spacing. An AR-15 is a civilian version of a 5.56 and can be only a semi-automatic rifle. A Ruger mini-14 is a small version of an M-14, which can be a semi-automatic rifle only. An old Grande can be only a semi-automatic rifle.

Although it is not recommended, it is possible to use a cartridge for the .223 in the M-16 semi-automatic rifle, and a cartridge for the M-16, which can be of a different size than the cartridge for the .223, in the .223 semi-automatic rifle. However, too much or too little head space in the barrel for the head of the cartridge can be problematic. As such, chambering of the barrel for each of these rifles, for example, is incomplete, and proper cartridge-head spacing is achieved later with use of a chambering device.

In military and civilian applications, to chamber the interior of the barrel of a .223 or an M-16, for instance, in the field, the gun barrel is typically removed from the gun. Then, a reamer of desired size is inserted into the barrel of the gun and pulled and rotated therein to give a desired finished cut to the interior of the barrel. Although reamers can satisfactorily finish the interior of the barrel of the gun, removing the barrel from the gun is time-consuming and relatively difficult in the field.

Therefore, it is desirable to provide a chambering device to finish chambering of a barrel of a gun. It is also desirable to provide a chambering device that does not require a barrel to be removed from a gun for chambering the interior of the barrel. Therefore, there is a need in the art to provide a chambering device that meets these desires.

SUMMARY OF THE INVENTION

Accordingly, the present invention is a chambering device for a gun. The chambering device includes a shank having a plurality of cutting flutes. The chambering device also includes a projection extending from one end of the shank and at least one spacer disposed about the projection. The chambering device further includes a shaft extending from the shank opposite the projection and adapted to rotate the shank along an interior of the barrel of the gun as the shank is pushed for enlarging the interior and providing a desired head spacing.

One advantage of the present invention is that a chambering device is provided for a gun that does not require the barrel to be removed from the gun for chambering the interior of the barrel. Another advantage of the present invention is that the chambering device permits easier chambering of the interior of the barrel of the gun. Yet another advantage of the present invention is that the chambering device is pushed to chamber the interior of the barrel. A further advantage of the present invention is that the chambering device provides the proper head spacing. Yet a further advantage of the present invention is that the chambering device may be used on both semi-automatic rifles and pistols.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a fragmentary elevational view of a portion of the chambering device illustrating the chambering device and gun in operative use at a particular point therein.

FIG. 4 is a view similar to FIG. 3 illustrating the chambering device and gun in operative use at another point therein.

FIG. 5 is an elevational front view of a portion of the chambering device of FIG. 1.

DESCRIPTION OF THE PREFERRED EMBODIMENT

Figure 1:
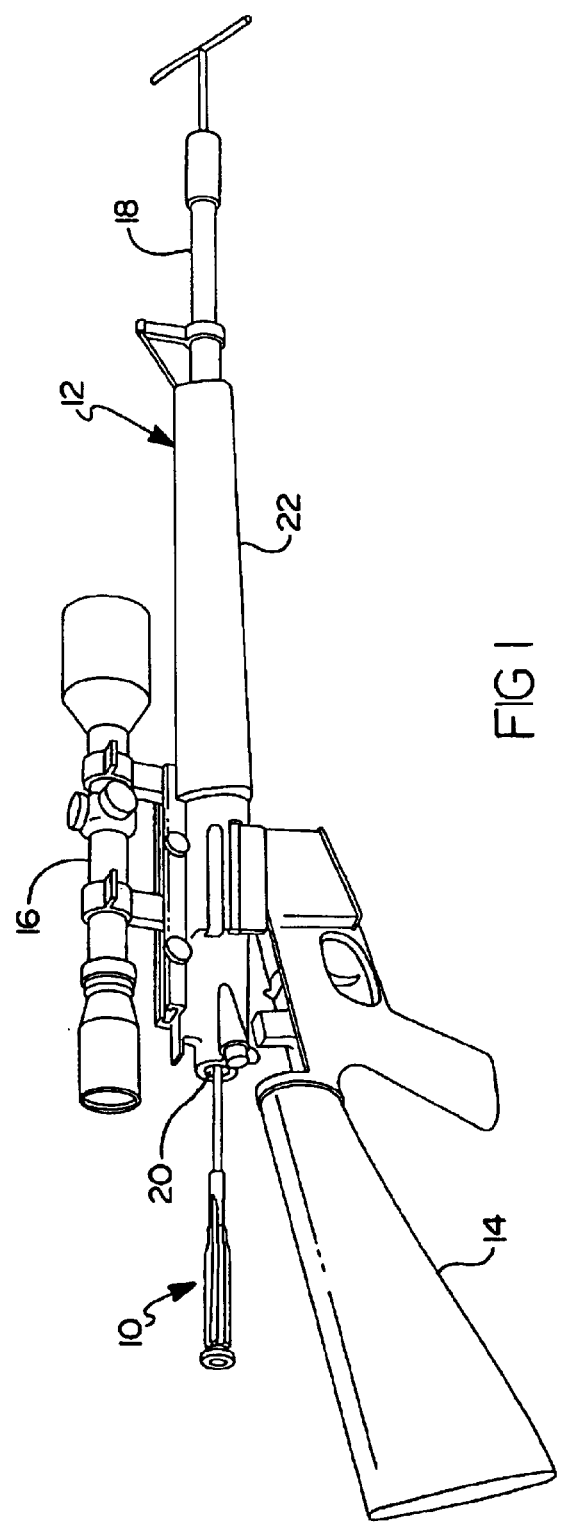
FIG. 1 is a perspective view of a chambering device, according to the present invention, illustrated in operational relationship with a gun.
Figure 2:
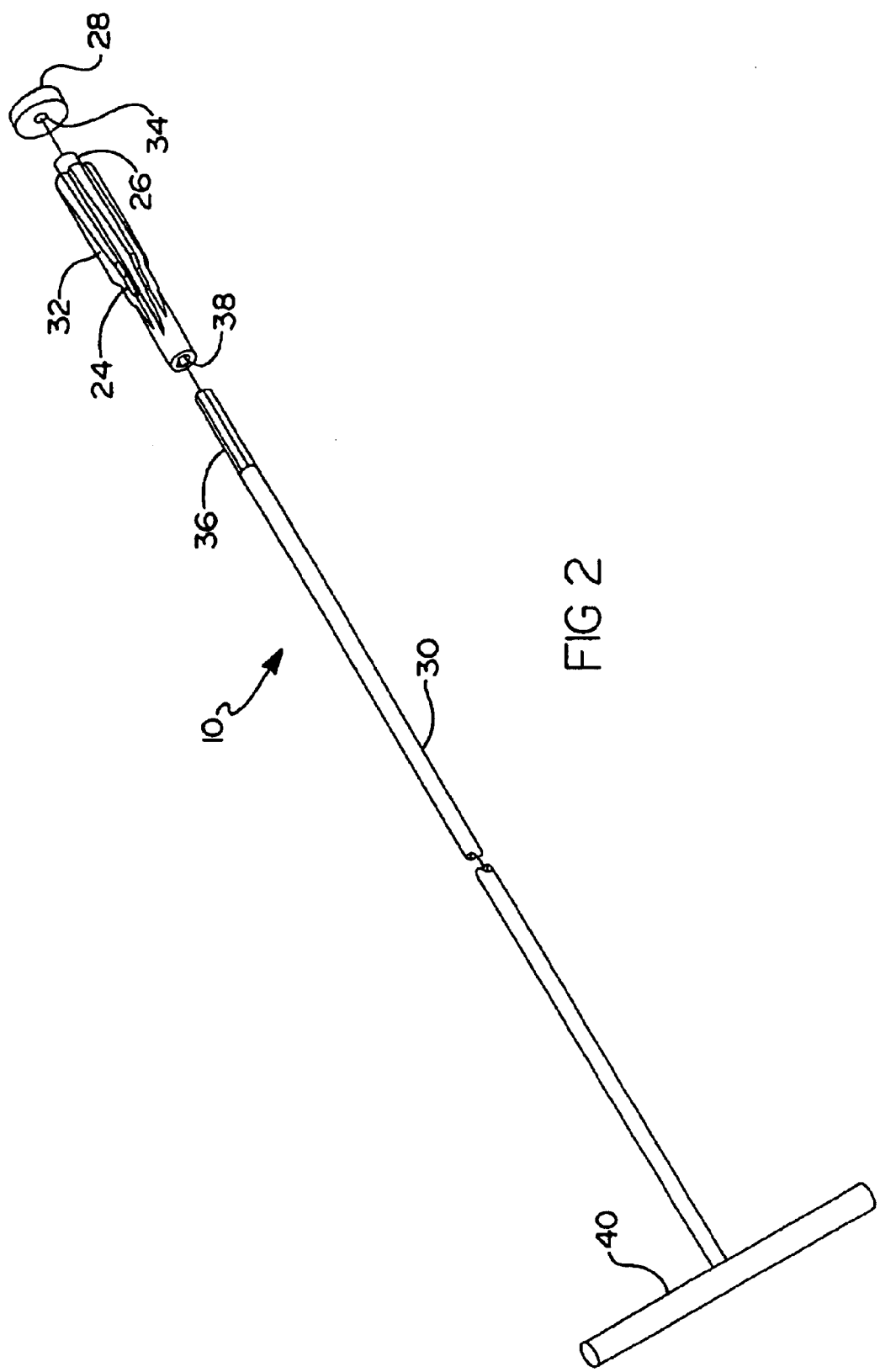
FIG. 2 is an exploded perspective view of the chambering device of FIG. 1.

Referring now to the drawings and in particular FIG. 1, one embodiment of a chambering device 10, according to the present invention, is shown for a gun, generally indicated at 12. The gun 12 includes a stock 14, a scope 16, and a barrel 18 supported by the stock 14. As illustrated in FIGS. 1 and 3, the barrel 18 extends longitudinally and is generally cylindrical, defining a hollow interior 20 longitudinally therethrough. The gun 12 also includes a longitudinally extending grip 22 disposed about a substantially central portion of the barrel 18. In the embodiment illustrated in FIG. 1, the gun 12 can be a 5.56 semi-automatic rifle (such as an M-16 or an AR-15) or a variant thereof. It should be appreciated that the chambering device 10 can be used with any other suitable automatic or semi-automatic rifle or pistol, such as a .223, a Ruger mini-14, and an Old Grande. It should also be appreciated that, except for the chambering device 10, the gun 12 is conventional and known in the art.

Referring to FIGS. 2 through 5, the chambering device 10 includes a shank 24, a projection 26, at least one spacer 28, and a shaft 30. The shank 24 extends longitudinally and is generally cylindrical in shape. The shank 24 has a plurality of cutting flutes 32 extending radially and longitudinally therealong and spaced circumferentially. More preferably, a portion of the end of the shank 24 proximate the shaft 30 does not have any cutting flutes 32. A substantially central portion of the shank 24 is tapered toward the shaft 30. As such, the end of the shank 24 proximate the projection 26 has a diameter greater than the diameter of the end of the shank 24 proximate the shaft 30. Further, at least a portion of the end of the shank 24 proximate the shaft 30 defines a hollow interior for matingly receiving the shaft 30, which will be described subsequently. It should be appreciated that the remainder of the interior of the shank 24 can be solid or hollow to any degree.

The projection 26 is generally cylindrical in shape and extends longitudinally from one end of the shank 24. The projection 26 has a diameter and length smaller than that of the shank 24. Those having ordinary skill in the art will appreciate, however, that the diameter and length of the projection 26 can be of any suitable size according to the size of the diameter of the largest spacer 28 and the number of spacers 28, respectively, to be disposed about the projection 26. In addition, the projection 26 extends from a substantially central area of the face of the end of the shank 24 opposite the shaft 30. Further, the interior of the projection 26 can be solid or hollow to any degree.

The spacer 28 is generally annular in shape and has a diameter greater than a diameter of the shank 24 and the projection 26. The spacer 28 is also shorter in longitudinal length than the shank 24 and may be no longer than the projection 26. Those having ordinary skill in the art will appreciate, however, that the diameter and length, or thickness, of the largest spacer 28 and the number of spacers 28 to be disposed about the projection 26 depend upon the amount of head spacing desired. The spacer 28 further includes an aperture 34 extending longitudinally and centrally therethrough to be securely received about the projection 26. Preferably, the spacer 28 is a thrust bearing 28. It should be appreciated that one or more spacers 28 may be disposed about the projection 26.

The shaft 30 extends from the shank 24 opposite the projection 26 and is adapted to rotate the shank 24 along the interior 20 of the barrel 18 of the gun 12 for enlarging the interior 20 and providing a desired head spacing. The shaft 30 is substantially cylindrical and has a diameter smaller than the diameter of each of the shank 24 and the spacer 28. The shaft 30 is also longer than each of the shank 24, projection 26, and spacer 28. Those having ordinary skill in the art will appreciate, however, that the shaft 30 can be of any suitable length to extend substantially entirely through the interior 20 of the barrel 18 of the gun 12. In one embodiment, the shaft 30 removably extends from the shank 24. More preferably, the shaft 30 is adapted to be matingly received within the shank 24 to transfer rotation to the shank 24. Even more preferably, a portion 36 of the end of the shaft 30 proximate the shank 24 has a hexagonal shape and is adapted to be matingly received within a portion 38 of the end of the shank 24 proximate the shaft 30 having a correspondingly hexagonal shape. However, those having ordinary skill in the art will appreciate that the shaft 30 can be matingly received within the shank 24 to transfer rotation to the shank 24 in any suitable manner.

The chambering device 10 may include a handle 40 extending from the shaft 30 opposite the shank 24. The handle 40 also is substantially cylindrical and disposed substantially perpendicular to the shaft 30. The handle 40 is further adapted to be rotated by a user of the chambering device 10 to rotate the shaft 30, shank 24, projection 26, and spacer 28 along the interior 20 of the barrel 18 of the gun 12 as it is pushed in a manner to be described for enlarging the interior 20 and providing a desired head spacing. Those having ordinary skill in the art will appreciate that the handle 40 can have any suitable size, shape, and structural relationship with respect to the remainder of the chambering device 10 to rotate the shaft 30, shank 24, projection 26, and spacer 28 as they are pushed along the interior 20 of the barrel 18 of the gun 12.

In operation as illustrated in FIGS. 3 and 4, a user (not shown), preferably located in the field, of the chambering device 10 securely disposes a desired number of spacers 28 of desired diameter and thickness about the projection 26, depending upon the amount of head spacing the user desires. Without removing the barrel 18 from the gun 12, the user then places the shank 24 in the chamber or rearward end of the interior 20 with the spacer 28 adjacent a bolt 42 of the gun 12. The user then inserts the shaft 30 of the chambering device 10 into the interior 20 of the barrel 18 from the forward end, or muzzle, of the gun 12. The user then securely inserts the shaft 30 within the shank 24. The user applies pressure to the shank 24 via the bolt 42 and spacer 28. Using the handle 40, the user turns the shank 24 via the handle 40 and shaft 30. The user then continues to push via the bolt 42 and rotate the handle 40 to push and rotate the shaft, shank 24, and at least one spacer 28 along the interior 20 of the barrel 18 of the gun 12 for enlarging the interior 20 and providing a desired head spacing.

As the chambering device 10 is pushed and rotated, the cutting flutes 26 cut the interior surface of the interior 20 of the barrel 18. Preferably, when the chambering operation is about half complete, the user removes the chambering device 10 from the gun 12 to gauge the newly chambered head spacing, clean the shank 24 of metal shavings and the like, for example, removed from the wall of the interior 20 of the barrel 18, and/or vary the size of the at least one spacer 28 to maximize the finish and head spacing of the barrel 18. The user then completes cutting of the barrel 18 to give a desired amount of head spacing and finished cut to the chambered interior 20 of the barrel 18. It should be appreciated that FIG. 3 shows the chambering device 10 being rotated and positioned at a particular point within the interior 20 of the barrel 18 of the gun 12. It should also be appreciated that FIG. 4 shows the chambering device 10 positioned at a finished point within the interior 20 of the barrel 18 closer to the muzzle of the gun 12 when the chambering operation is complete.

The chambering device 10 of the present invention does not require the barrel 18 to be removed from the gun 12 for chambering the interior 20 of the barrel 18. The chambering device 10 also permits easier chambering of the interior 20 of the barrel 18. The chambering device 10 further is pushed and rotated to chamber the interior 20 of the barrel 18. The chambering device 10 provides the proper head spacing as well.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A chambering device for a barrel of a gun comprising:
   a shank extending longitudinally between a front end and a rear end and having a plurality of cutting flutes disposed between the front end and the rear end;
   a projection extending from the rear end of said shank;
   at least one spacer disposed about said projection; and
   a shaft extending to the front end of said shank and adapted to rotate said shank along an interior of the barrel of the gun for enlarging the interior and providing a desired head spacing.

2. A chambering device as set forth in claim 1 wherein said at least one spacer has a diameter greater than the diameter of said shank.

3. A chambering device as set forth in claim 1 wherein said projection has a diameter less than the diameter of said shank.

4. A chambering device as set forth in claim 1 wherein said shaft is adapted to be matingly received within the front end of said shank to transfer rotation to said shank.

5. A chambering device as set forth in claim 1 wherein a substantially central portion of said shank is tapered toward said shaft.

6. A chambering device as set forth in claim 1 wherein said spacer is a thrust bearing.

7. A chambering device as set forth in claim 1 wherein said shank is substantially cylindrical.

8. A chambering device for a barrel of a gun comprising:

a shank extending longitudinally and having a plurality of cutting flutes;

a projection extending from one end of said shank;

at least one spacer disposed about said projection;

a shaft extending from said shank opposite said projection and adapted to rotate said shank along an interior of the barrel of the gun for enlarging the interior and providing a desired head spacing; and wherein said shaft removably extends from said shank.

9. A chambering device for a barrel of a gun comprising:

a shank extending longitudinally and having a plurality of cutting flutes;

a projection extending from one end of said shank;

at least one spacer disposed about said projection;

a shaft extending from said shank opposite said projection and adapted to rotate said shank along an interior of the barrel of the gun for enlarging the interior and providing a desired head spacing; and wherein said chambering device further includes a handle extending from said shaft opposite said shank.

10. A chambering device as set forth in claim 9 wherein said handle is substantially cylindrical and disposed substantially perpendicular to said shaft.

11. A method for chambering a barrel of a gun, said method comprising the steps of:

providing a shank extending longitudinally and having a plurality of cutting flutes;

providing a projection extending from one end of the shank;

providing at least one spacer and disposing the spacer about the projection;

providing a shaft extending from the shank opposite the projection;

disposing the at least one spacer against a bolt of the gun without removing the barrel from the gun; and pushing and rotating the shank along the interior of the barrel of the gun for enlarging the interior and providing a desired head spacing.

12. A method as set forth in claim 11, wherein said shaft is securely inserted within said shank.

13. A method as set forth in claim 11 including the step of inserting the shaft into the interior of the barrel from the forward end of the gun.

14. A method as set forth in claim 11 including the step of providing a handle extending from the shaft opposite the shank.

15. A method as set forth in claim 14 turning the handle and shaft to rotate the shank.

16. A method as set forth in claim 15 wherein said shaft is pushed and the handle is rotated to push and rotate the shank along the interior of the barrel of the gun for enlarging the interior and providing a desired head spacing.

17. A method as set forth in claim 11 wherein when the chambering method is about half complete, the chambering device is removed from the gun.

18. A method as set forth in claim 17 wherein the newly chambered head spacing is gauged upon removal of the chambering device.

19. A method as set forth in claim 17 wherein the shank is cleaned upon removal of the shank from the barrel.

20. A method as set forth in claim 17 wherein the size of the spacer is varied to maximize the head spacing of the barrel.

* * * * *